United States Patent [19]

Brown

[11] 4,028,289

[45] June 7, 1977

[54] FOAMED POLYESTER RESIN

[75] Inventor: William F. Brown, Bonduel, Wis.

[73] Assignee: Vast Products Inc., Bonduel, Wis.

[22] Filed: Oct. 5, 1976

[21] Appl. No.: 729,876

[52] U.S. Cl. .................... 260/2.5 N; 260/40 R
[51] Int. Cl.² ................................. C08V 9/08
[58] Field of Search ......................... 260/2.5 N

[56] References Cited

UNITED STATES PATENTS

| | | | |
|---|---|---|---|
| 3,786,004 | 1/1974 | Furuya et al. | 260/2.5 N |
| 3,855,160 | 12/1974 | Shiotsu et al. | 260/2.5 N |
| 3,920,589 | 11/1975 | Jacobs et al. | 260/2.5 N |

Primary Examiner—Morton Foelak

Attorney, Agent, or Firm—Quarles & Brady

[57] ABSTRACT

A method of preparing lightweight molded objects having high structural strength and uniform closed cell structure comprises forming a uniform mixture of a liquid general purpose polyester resin, an inorganic filler or a mixture thereof, bicarbonate of soda, sodium acetate, aluminum ammonium sulfate, ferrous ammonium sulfate and tannic acid and a catalyst mixture containing a peroxide catalyst for the polyester resin, an acidic substance to release the carbon dioxide gas from the bicarbonate of soda and water. The resin mixture and the catalyst mixture are uniformly blended and applied to the mold or cavity and the foamed polyester allowed to form.

8 Claims, No Drawings

FOAMED POLYESTER RESIN

BACKGROUND OF THE INVENTION

It is generally known that objects made of foamed polyester resins are stronger both in tensile and elongation strength than nonfoamed polyesters. Foamed polyesters are also more capable of absorbing shock. As a result, there is an active interest in the development of safe, inexpensive methods for preparing foamed polyesters.

Although objects are commercially available which are prepared by known methods of preparing foamed polyesters, the methods that have been employed are not without disadvantage. Some of the previously known methods require the use of expensive mixing apparatus; others require relatively expensive ingredients and still others may require heating the mold and/or resin mixture. Therefore, a need still exists for a safe, inexpensive, simple method of preparing foamed polyesters.

SUMMARY OF THE INVENTION

It is a general object of the present invention to disclose a simple, inexpensive, safe method for preparing objects of foamed polyester resins. It is a further object of the present invention to disclose a method of preparing a foamed polyester resin material which contains inorganic fillers and can be used to replace the more expensive polyester-fiberglass mixtures or the heavier, more fragile vitreous china which is currently used.

It is a still further object to disclose a method of preparing objects of foamed polyester resin, which method is unusually safe and does not require the use of dangerous chemicals or external heat.

The method of the present invention comprises preparing a uniform mixture of a liquid general purpose polyester resin, an inorganic filler, bicarbonate of soda, sodium acetate, aluminum ammonium sulfate, ferrous ammonium sulfate, and tannic acid; forming a separate mixture of a peroxide catalyst for the polyester resin, an acidic substance such as glacial acetic acid and water; then forming a uniform blend of the polyester mixture and the catalyst mixture and applying the resulting mixture to a mold or cavity and allowing the foamed polyester to form.

The objects prepared by the method of the present invention are comprised of a foamed polyester containing an inorganic filler and are lightweight, exhibit structural strength, uniform closed cell structure, and have water impervious skins. The resulting objects also have good rigidity, good acoustics, and high resistance to fire. Therefore, the method of the invention can be used to prepare replacement parts or to provide structural materials which require high strength, a smooth and high gloss appearance, low density and other desirable properties.

DESCRIPTION OF THE PREFERRED EMBODIMENTS

In the preferred practice of the method of the present invention a uniform resin mixture is formed of a liquid general purpose polyester resin, an inorganic filler, powder bicarbonate of soda, and effective amounts of sodium acetate, ferrous ammonium sulfate, aluminum ammonium sulfate, and tannic acid; a catalyst mixture is prepared containing a peroxide catalyst with a polyester resin, an acidic substance such as glacial acetic acid to stimulate the release of the carbon dioxide gas from the bicarbonate of soda, and water. The resin mixture and the catalyst mixture are then uniformly blended and applied to a mold or cavity and the foamed polyester allowed to form.

The polyester resin preferred for use in the method of the present invention is a general purpose polyester resin such as that available from Cook Paint & Varnish of Kansas City, Mo. under the stock number X300. The general purpose polyester resins are normally prepared from a mixture of phthalic anhydride, maleic anhydride and propylene glycol at a temperature of 200° C under an inert gas blanket. By means of acid value control and the use of excess glycol, resins can be prepared with molecular weights of 1,000–2,000 to retain styrene compatibility and low working viscosities. After cooling, the polyester is cut with about 30% of styrene and an inhibitor such as hydroquinone is added.

The general purpose polyester resins preferred for use have an approximate molecular weight of 1,000 or less, an acid value of less than 50 and they range in viscosity from 500–1,000 cps. In addition, they retain 30% of the styrene monomer. The resin may also contain other additives including promoters for the peroxide catalyst.

The preferred polyester resin is liquid and it will flow and readily impregnate the fibers of the inorganic fillers. The polyester resin-filler mixture will preferably contain at least 15–25% of the polyester resin based on the weight of the final polyester-filler mixture. The amount of the resin must be adequate to wet the fillers and also foam.

A wide variety of commercially available general purpose polyester resins may be employed in the present invention provided they have suitable viscosity and do not contain additives which interfere with the process.

The inorganic fillers which are preferred for use in the present invention are wollastonite, nepheline syenite and mica. These inorganic fillers not only provide strength to the finished product but also increase its density and fire resistance.

Wollastonite is a natural form of calcium silicate. It is available from Harwick Chemical Company of Elk Grove Village, Ill. The material is a fibrous or fine granular crystalline material which is insoluable in water and has a melting point of about 1540° F. The material not only adds tensile strength to the finished product but also serves as an insulator.

The nepheline syenite is a naturally available form of sodium potassium aluminum silicate which also contains approximately 18 different identifiable substances. It is available under the trade name MINEX from Chem-Materials of Akron, Ohio. Nepheline syenite is an excellent filler as it is extremely easy to wet and disperse and permits very high loadings. It is produced in a finely ground form which exhibits outstanding dry brightness, low vehicle demand and extremely low tinting strength.

Mica is also preferred as a filler as it contributes not only structural strength but also serves as a fire retardant and insulator in the final products. Other inorganic fillers that can be employed are silica sand, bentonite clay, kaolin clay and the like.

The inorganic filler or fillers to be included and the amount of each depends to a great extent upon the desired properties of the final foamed and filled polyester resin objects. The content of the filler in the combined polyester-filler material may range from several percent to as much as 80% or more of the weight of the polyester-filler material. However, the amount of inorganic filler that is employed must be an amount which can be wetted by the polyester resin which is present and which does not interfere with the foaming process. Especially preferred for use in the present invention is a mixture of inorganic fillers containing 8–30% each of wollastonite, nepheline syenite and mica.

The preferred catalyst for the polyester resin is a mixture of organic peroxides such as benzoyl peroxide and methyl ethyl ketone peroxide. The benzoyl peroxide is inexpensive, readily available and easy to handle as it is available in paste, liquid and powder form. The methyl ethyl ketone peroxide is a liquid. Generally, it is preferred to have each of the benzoyl peroxide and the methyl ethyl ketone peroxide present as 0.5 to 3.5% of the polyester resin by weight. Generally speaking, the more of the catalyst solution used, the faster heat builds up within the final blend which decreases the setup time. Also, it has been found that the higher the percentage of catalyst solution which is used, the lower the density of the final product. Obviously, there must be sufficient catalyst present to cure and solidify the resin but not so much that the resin sets up before the foaming can take place. The amount of catalyst mixture employed determines the length of the "setup" time for the foamed polyester. The setup time can be varied between 15 seconds and 4 minutes on a dry day (72° F, 68% humidity) and between 2 minutes and 15 minutes on a humid day. Suitable peroxide mixtures for use in the present invention are available from Noury Chemical Corporation of Burt, N.Y. under the code numbers BF 16 and BF 50.

The peroxide catalysts require promoters to initiate their breakdown. The general purpose resins generally available and preferred for use in the invention already contain promoters for benzoyl peroxide and methyl ethyl ketone peroxide. However, if such promoters are not present in the resin selected, they can be added to the resin. An effective promoter for benzoyl peroxide is a tertiary amine such as dimethyl aniline. Effective promoters for ketone peroxides, such as methyl ethyl ketone peroxide, are cobalt salts such as cobalt naphthenate. Neither type of promoter, however, will promote the breakdown of the other type of peroxide.

The sodium bicarbonate is preferably employed in the form of a finely divided powder so that it can be easily blended and uniformly distributed throughout the resin to provide uniform cell development and control. The bicarbonate principally functions to release carbon dioxide gas in the presence of the glacial acetic acid, heat and water. It is preferably present as 1–3% of the total peroxide catalyst by weight.

Glacial acetic acid is the preferred acidic substance to be included to facilitate the release of the carbon dioxide from the sodium bicarbonate. Other acidic substances can be used but would probably not provide any advantages. The amount of the glacial acetic acid which is to be present is determined by the amount of soda bicarbonate which is employed and it is preferred that the amount of glacial acetic acid present be an amount which is sufficient to release the carbon dioxide gas from the sodium bicarbonate. Normally, the amount of glacial acetic acid will not exceed 4% of the total peroxide weight.

When the glacial acetic acid containing catalyst mixture is combined with the resin mixture, the glacial acetic acid causes a bubbling action within the final mixture and starts the movement of the polyester resin. After three or four minutes, the peroxide starts developing heat which also adds in the release of carbon dioxide gas which starts the gelation of the cells of the polyester-catalyst mixture.

Water is included in the catalyst mixture in an amount ranging from 1–5% of the weight of the peroxide catalyst and acetic acid solution. As the percentage of the water in the catalyst solution is increased to approximately 4% of the weight of the peroxides and the acetic acid, a very low density foam is produced which is not self-skinning and results in parts of very low density. As the percentage of the water is decreased to the range of ½–2% of the weight of the peroxide and acetic acid solution, the density of the final foamed-filled polyester product becomes much easier to regulate by a quantity filling method and the final product is self-skinning on all sides.

Although the exact mechanism which they operate is not known, sodium acetate, aluminum ammonium sulfate, ferrous ammonium sulfate and tannic acid improve the reliability of the method and the quality of the final foamed-filled product. The four ingredients appear to cause heat to develop within the final resin mixture more quickly and to stabilize the cell structure development which enables the production of a material with the desired density. Without one or more of these ingredients, it is difficult to regulate the density in the cell structure formation. It may be that the tannic acid combines with the ferrous ammonium sulfate to speed the development of heat and that this is good for the formation of the gel structure. Once the gel structure has been formed, the aluminum ammonium sulfate appears to serve as a stabilizer. The sodium acetate may serve as a buffer but it also seems to aid in the cell formation of the polyester foamed system. In the preferred practice of the invention, the sodium acetate, the ferrous ammonium sulfate, the aluminum ammonium sulfate and the tannic acid are each present as 0.25–1% of the benzoyl peroxide by weight, with ½% being especially preferred.

In the preferred practice of the method of the invention, a polyester resin-inorganic filler base blend is prepared consisting of all of the ingredients except the catalyst mixture. The blend is prepared by thoroughly mixing the ingredients in a batch mixer. A separate catalyst blend is also prepared by blending the benzoyl peroxide and methyl ethyl ketone peroxide with the glacial acetic acid and water in an agitated catalyst pot. The agitation of the material within the pot is carried on very slowly but at a speed sufficient to keep the peroxides, acetic acid and water in solution.

The polyester resin-filler base blend and the catalyst blend are not combined until the final product is to be formed. The two blends or mixtures are then mixed together by any suitable means to form a final blend and the final blend is applied to the mold, cavity, tool, pattern, surface and the like as required to form the desired foamed product. The final blend or mixture may be sprayed, poured, cast, injected, brushed, rolled or applied in any other way to the mold. The entire method can be carried out at room temperature without externally heating the mold or the ingredients.

In the preferred practice of the invention, the final blend of polyester-filler and catalyst is applied to the surface of the mold with a four-hose pump with one hose supplying the base blend or polyester mixture; a second hose supplying the catalyst blend; a third hose supplying a clean-out material such as acetone; and a fourth hose supplying air. A pump delivers the polyester blend and the catalyst blend to the gun and the catalyst blend is mechanically mixed with the base blend and catalyzes the mixture within the gun. It is possible to adjust the ratio of the catalyzer solution to the base blend within the gun. The material is then sprayed on or poured onto the desired surface or cavity by the gun depending upon the application of air. If the air line is closed, the material will be poured by the gun. If the air is introduced, the material will be sprayed. Guns of this type may be obtained from Poly Craft of California. Although the gun-type application is preferred, the polyester-filler mixture and the catalyst mixture can be hand or mechanically mixed and applied to the mold by any suitable means as previously indicated.

The density of the final product can be regulated at time of application by controlling the amount of the material placed in the cavity which, of course, can be varied from a substantial underfill to compaction. Obviously, if the cavity is underfilled, and the resin is allowed to foam to its maximum, the density will be less than if the resin is overfilled and the mold is covered and the material compacted.

The practice of the method of the present invention is further illustrated by the following examples.

EXAMPLE 1

A one-piece bathtub and wall unit weighing approximately 55 pounds was prepared as follows: first, a polyester-filler base blend consisting of the following ingredients was thoroughly mixed in a batch mixer — 11½ lbs. polyester resin (GP X300 Cook Paint & Varnish Company, Kansas City, Mo.), 4½ lbs. mica, 19 lbs. of wollastonite, 19 lbs. of nepheline syenite, 0.017 lbs. sodium acetate, 0.017 lbs. aluminum ammonium sulfate, 0.017 lbs. ferrous ammonium sulfate, 0.017 lbs. tannic acid, and 0.025 lbs. of bicarbonate of soda powder. A catalyst mixture was prepared in an agitated catalyst pot. The catalyst mixture consisted of the following ingredients: benzoyl peroxide — 0.65 lbs., methyl ethyl ketone peroxide — 0.65 lbs., glacial acetic acid — 0.05 lbs., and water — 0.02 lbs.

The polyester resin containing base blend and the catalyst mixture were then mixed and applied by the previously described pump-gun method into a mold in a uniformly proportioned manner. After the material was set and cured the final product had a smooth ceramic-like water impervious surface skin of approximately 0.040–0.060 inch thickness, an average wall thickness of approximately ½ inch and a closed cell structure with a cell diameter of approximately 1/64 inch. The unit had an overall length of 60 inches, width of 30 inches, tub depth of 16 inches and a wall height of 80 inches. The density of the foamed and filled polyester resin material was approximately 19 lbs. per cubic foot.

EXAMPLE 2

A floatation insert having a weight of 54 pounds was prepared in the following manner.

First a base blend polyester-filler mixture was prepared consisting of a uniform mixture of 11½ lbs. of polyester resin (Cook GP X300), 4½ lbs. mica, 19 lbs. wollastonite, 19 lbs. nepheline syenite, 0.25 lbs. sodium acetate, 0.25 lbs. aluminum ammonium sulfate, 0.025 lbs. ferrous ammonium sulfate, 0.025 lbs. tannic acid, and 0.025 lbs. of bicarbonate of soda powder. A catalyst mixture was also prepared in an agitated catalyst pot consisting of the following ingredients: benzoyl peroxide — 1.40 lbs., methyl ethyl ketone peroxide — 1.40 lbs., glacial acetic acid — 0.07 lbs., and water — 0.07 lbs. The base blend and the catalyst mixture were then blended and applied to a mold with the previously described pumpgun. The mold was only partially filled and the mixture was allowed to foam freely. The final product had a mixed open and closed discreet cell structure with cell diameters of approximately ⅛–3/16 inches. The structure was water impervious but has a rough surface texture with no skin formation. The material had a density of approximately 11 lbs. per cubic foot. The overall size of the structure was approximately 18 inches long, 30 inches wide and 14 inches deep with a wall thickness of approximately ⅝ inches. The product was useful as an insulator or floatation liner and had only moderate structural strength.

With the method of the present invention, it is possible to prepare foamed-filled polyester products having extremely thick skins or no skins depending upon the conditions. Generally speaking, if a high temperature results quickly from the mixture, the skin will be thick and if a free rise is allowed in the mold, a relatively thin skin will result. The thickness of the skin can be determined to some extent by the quantity filling method. The quantity filling method is one in which the mold is filled and then covered and the thickness of the skin is determined by the degree of compaction upon the mold and the extent of the filling of the mold.

From the foregoing it will be apparent that the foamed-filled polyester resin objects prepared by the method of the present invention may have a wide range of densities, structural strength and skin or surface condition. In the preferred practice, the formulations have high structural strength and uniform closed cell structure resulting in a final product that may be used as a replacement or substitute for structural materials which require or may possess high strength, smooth and high gloss appearance, low density and other desirable properties. The filled-foamed polyester resin objects prepared by the method may be used as replacements for vitreous china in water closets, bathtubs and wall units. The method can also be used to prepare resin-filler materials to replace fiberglass-reinforced polyesters in boats, automobile parts, septic systems, refrigeration, floor and roof insulation, wall paneling, sound deadening structural materials and modular housing structures as well.

It will be readily apparent to those skilled in the art that a variety of changes may be made without departing from the spirit and scope of my invention. In view of the foregoing, it is intended that the invention is not to be limited by the specific examples which are to serve as illustrations only.

I claim:

1. The method of preparing objects of a foamed-filled polyester resin material which comprises (a) preparing a liquid resin blend comprised of a liquid polyester resin, an inorganic filler, bicarbonate of soda, and an effective amount of a cell stabilizing mixture containing sodium acetate, aluminum ammonium sulfate, ferrous ammonium sulfate and tannic acid; (b) preparing a catalyst blend comprised of an effective amount of an organic peroxide catalyst for the polyester resin, an acidic substance effective to release carbon dioxide from the bicarbonate of soda, and water; (c) combining the resin blend and the catalyst blend to form a uniform liquid mixture; and (d) applying that mixture to a mold or surface and allowing the mixture to foam.

2. The method of claim 1 in which the inorganic filler is a mixture of wollastonite nepheline syenite and mica.

3. The method of claim 1 in which the sodium bicarbonate is present in an amount equal to 1–3% of the peroxide catalyst weight.

4. The method of claim 3 in which the acidic substance is glacial acetic acid which is present in an amount sufficient to effect the release of carbon dioxide from the sodium bicarbonate.

5. The method of claim 4 in which the organic peroxide catalyst is a mixture of benzoyl peroxide and methyl ethyl ketone peroxide in which each is present in an amount equivalent to 0.5–3.5% by weight of the polyester resin.

6. The method of claim 1 in which each of the ingredients is present in an amount equivalent to about ½% of the benzoyl peroxide by weight.

7. The method of claim 6 in which the amount of water present in the catalyst mixture is about 1–4% of the weight of the organic peroxide catalyst and the glacial acetic acid.

8. The method of claim 7 in which the inorganic filler is present in an amount of up to about 80% by weight of the combined resin-filler mixture.

* * * * *